(12) United States Patent
Ohtomo et al.

(10) Patent No.: US 6,264,165 B1
(45) Date of Patent: Jul. 24, 2001

(54) STAGE AND SUPPORTING MECHANISM FOR SUPPORTING MOVABLE MIRROR ON STAGE

(75) Inventors: Toshiya Ohtomo, Tokyo; Yutaka Hayashi, Kanagawa-ken, both of (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/428,540

(22) Filed: Oct. 28, 1999

Related U.S. Application Data

(62) Division of application No. 08/826,381, filed on Apr. 9, 1997, now Pat. No. 6,012,697.

(30) Foreign Application Priority Data

| Apr. 12, 1996 | (JP) | ................................................ 8-115332 |
| Aug. 5, 1996 | (JP) | ................................................ 8-221753 |

(51) Int. Cl.[7] ............................ A47B 23/00; G03B 27/42
(52) U.S. Cl. .............. 248/694; 248/466; 148/DIG. 102; 355/53; 355/72; 356/401; 359/848; 430/22
(58) Field of Search ....................... 248/694, 424, 248/489, 487, 466, 346.01; 355/53, 72; 148/DIG. 102; 356/401; 430/22; 359/848, 874, 871

(56) References Cited

U.S. PATENT DOCUMENTS

| 3,669,393 | | 6/1972 | Paine et al. . |
| 3,824,000 | | 7/1974 | Burns . |
| 3,850,402 | | 11/1974 | Ando . |
| 3,897,139 | | 7/1975 | Caruolo et al. . |
| 4,060,314 | * | 11/1977 | Heinz ...................................... 248/487 |
| 4,066,342 | | 1/1978 | Arends et al. . |
| 4,442,524 | | 4/1984 | Reeder et al. . |
| 4,451,119 | * | 5/1984 | Meyers et al. ......................... 359/846 |
| 4,648,692 | * | 3/1987 | Kinoshita .............................. 359/873 |
| 4,657,361 | | 4/1987 | Eitel et al. . |
| 4,766,465 | * | 8/1988 | Takahashi ............................... 355/53 |
| 4,807,839 | * | 2/1989 | Nettleton et al. ..................... 248/476 |
| 4,892,283 | * | 1/1990 | Cutburth ............................... 248/466 |
| 4,946,126 | | 8/1990 | Williams . |
| 5,065,974 | | 11/1991 | Lapp . |
| 5,066,131 | * | 11/1991 | Iwata et al. ........................... 356/401 |
| 5,610,686 | * | 3/1997 | Osanai .................................... 355/72 |
| 5,699,145 | * | 12/1997 | Makinouchi et al. .................. 355/53 |
| 5,858,587 | * | 1/1999 | Yamane et al. ......................... 430/22 |
| 6,008,500 | * | 12/1999 | Lee ....................................... 250/548 |
| 6,134,981 | * | 10/2000 | Novak et al. ...................... 74/490.09 |

* cited by examiner

*Primary Examiner*—Anita M. King
(74) *Attorney, Agent, or Firm*—Armstrong, Westerman, McLeland, Hattori, & Naughton, LLP

(57) ABSTRACT

A movable mirror supporting mechanism for supporting a movable mirror forming a part of an interferometric measurement system and having a rectangular cross-section onto an object, with a reflecting surface of said movable mirror being arranged normal to a measuring direction. The movable mirror supporting mechanism includes at least two fixtures for securing the movable mirror from above onto respective movable mirror supporting portions provided on the object. Positions on the movable mirror at which the movable mirror is secured onto the measuring object by the fixtures are defined to be out of that area of the reflecting surface of the movable mirror which is utilized for interferometric measurement.

8 Claims, 9 Drawing Sheets

STAGE AND SUPPORTING MECHANISM FOR SUPPORTING MOVABLE MIRROR ON STAGE

This appln is a Div of Ser. No. 08/826,381 Apr. 9, 1997, U.S. Pat. No. 6,012,697.

BACKGROUND OF THE INVENTION

The present invention relates to a stage having a movable mirror attached thereto, for carrying a material piece such as a reticle or a wafer and used in a projection exposure apparatus, for example, and also relates to a supporting mechanism for supporting such a movable mirror on such a stage. More particularly, the present invention relates to a stage having a movable mirror attached thereto, the movable mirror forming a part of an interferometric measurement system for measuring the position of the stage, and also relates to a supporting mechanism for supporting such movable mirror on such a stage.

In a lithographic process used to fabricate semiconductor devices or the like, there have been commonly used demagnification projection exposure apparatus of the type in which a wafer undergoes stepping movements for sequential exposure operations to a plurality of exposure sites on the wafer (the exposure apparatus of this type are called "steppers"). The apparatus has a moving stage for carrying a material piece such as a wafer and capable of two-axis translational movements in a plane (or "XY-stage"). Further, in order to measure X- and Y-coordinate positions of the moving stage, a pair of light wave interferometric measurement systems are commonly used as an apparatus for measuring the coordinate positions (distances) by utilizing the interference between two coherent light beams such as laser beams.

Generally, the apparatus of this type comprises a reflecting mirror (or movable mirror) which is mounted on one end of the moving stage (which is the measuring object) such that it extends along one side edge of the moving stage and in a direction normal to the measuring direction. The apparatus further comprises an interferometer which is disposed outside the moving stage so as to face the mirror surface of the movable mirror. The interferometer emits a beam of frequency-stabilized laser (such as helium-neon laser) to the movable mirror so as to provide interference between the beam reflected by the movable mirror and another beam not reflected by the movable mirror, which interference is used to achieve very precise measurement with a high resolution of about 0.01 μm, for example. The interferometer cannot operate without the moving mirror provided on the measuring object (or moving stage), and so the movable mirror forms part of the interferometric measurement system.

FIG. 1 schematically shows an exemplified supporting mechanism for supporting a movable mirror on a moving stage, which may be used for the apparatus of this type. As is common in the art, a reflecting mirror or movable mirror 1 (shown by imaginary lines in FIG. 1) is formed by a glass body having a rectangular cross-section with four side surfaces, one of which is silvered to form a mirror surface. The movable mirror 1 is supported in the vertical direction by a pair of movable mirror supporting surfaces 4A and 4B, which comprise top surfaces of respective raised portions formed on a top surface of an elongate, belt-like raised portion 3 having a predetermined width. The raised portion 3 is formed on one side edge of the stage body 2, and the movable mirror supporting surfaces 4A and 4B are spaced apart from each other in the longitudinal direction of the raised portion 3. The movable mirror 1 is further supported in the measuring direction (represented by arrow A in FIG. 1) such that it is clamped between i) a pair of supporting surfaces 6A and 6B and ii) an associated pair of preloaded push pins 9A and 9B. The supporting surfaces 6A and 6B are vertical, rectangular surfaces on the inside of corresponding pair of reference protrusions 5A and 5B having a box-like shape and formed on the top surface of the stage body 2 at positions adjacent to the movable mirror supporting surfaces 4A and 4B, respectively, and on one side of these surfaces 4A and 4B in the measuring direction. The push pins 9A and 9B are slidably supported by corresponding pair of push-pin-supporting protrusions 7A and 7B formed on the top surface of the stage body 2 at positions adjacent to the movable mirror supporting surfaces 4A and 4B, respectively, and on the other side of these surfaces 4A and 4B in the measuring direction. The push pins 9A and 9B are inserted from the outside of the push-pin-supporting protrusions 7A and 7B into corresponding holes formed in the protrusions 7A and 7B, respectively, and are urged by respective, associated coil springs 8A and 8B toward the supporting surfaces 6A and 6B, respectively. The push pins 9A and 9B have flat tip end surfaces.

Unfortunately, this conventional movable mirror supporting mechanism suffers from a problem that when the stage body 2 supporting the reflecting mirror or movable mirror 1 is driven in a certain direction (e.g. in the measuring direction), an inertial force produced by the acceleration of the driven stage body 2 acts on the moving mirror 1 which is clamped between i) the supporting surfaces 6A and 6B of the reference protrusions 5A and 5B and ii) the preloaded push pins 9A and 9B facing to the supporting surfaces 6A and 6B, resulting In that the coil springs 8A and 8B may possibly yield or be compressed to allow the movable mirror 1 to displace apart from the supporting surfaces 6A and 6B into an erroneous position and, in certain circumstances, even remain in that erroneous position. This results in that the position (translational or angular) of the movable mirror 1 relative to the stage body 2 may possibly change while the stage body 2 is being driven, and that a considerable error may possibly occur in the measured value provided by the interferometric measurement system.

In view of the foregoing, it could be one approach to this problem that, instead of clamping the moving mirror 1 by urging it against the supporting surfaces 6A and 6B by the preloaded push pins 9A and 9B, the moving mirror 1 is fixedly secured onto the stage body 2, so that any displacement of the movable mirror 1 relative to the stage body 2 may be prevented even when an inertial force produced by the acceleration of the driven stage body 2 acts on the movable mirror 1.

However, as commonly known to those skilled in the art, the glass body constituting the movable mirror 1 cannot be rigid enough to be considered as an ideal rigid body; in fact, various forces acting on such movable mirror 1 would cause minute but nonnegligible deformations of the moving mirror 1. In addition, any deformation of the mirror surface of the movable mirror 1 which may be caused by the supporting arrangement may greatly affect the measuring accuracy of the interferometric measurement system because the resolution of the measurement is very high (about 0.01 μμ). As the result, the arrangement in which a movable mirror is fixedly secured onto a stage body by means of fixtures has not been used so far.

Regarding the materials for a stage body or material piece support and a movable mirror or reflecting mirror for use with an interferometer and supported on the stage body, there have been three major options. The first option is that the movable mirror is made of an optical glass while the stage body is made of a ceramic material. The second option is that either of them is made of an optical glass. The third option is that both of them are made of a ceramic material.

Unfortunately, with a conventional stage or a material piece support comprising a movable mirror made of an optical glass and a stage body made of a ceramic material, the movable mirror may be subject to deformation caused by a temperature change, since the movable mirror and the stage body are made of different materials so that they have different thermal expansion coefficients. That is, when the temperature in the environment of the movable mirror changes, the movable mirror and the stage body produce different thermal expansions, resulting in some harmful deformation of the mirror surface of the movable mirror, which leads to a deterioration in the accuracy of the measured positions of the stage body determined by the interferometer.

In the case where the movable mirror and the stage body are made of an optical glass or optical glasses, the stage body should have a less rigidity and necessitate a higher cost than a stage body made of a ceramic material. The less rigidity of the stage body results in the less stability in positioning of the mirror surface of the movable mirror carried on the stage body, leading to a possible deterioration of the measuring accuracy of the interferometer.

In the case where the movable mirror and the stage body are made of a ceramic material, there arise a problem that the reflectivity of the movable mirror is lowered by the existence of pores in the ceramic material. In general, powder which is to be sintered into a certain ceramic material has a porosity of about 40%. Through the sintering process, the porosity lowers due to various factors including the surface tension of molten particles. Thus, most of the space contributing the porosity vanishes during the sintering process, and a little space remains after the sintering process and forms pores in the ceramic material. Apparently, a higher porosity of the ceramic material for the movable mirror results in a lower reflectivity of the movable mirror. The porosity of a ceramic material may be reduced by suitably selecting the powder and sintering method used for the ceramic material, and thereby a more compact ceramic material may be obtained; however, in general, a highly compact ceramic material created in this manner is very costly. Accordingly, when the stage body and the movable mirror were formed as an integral part made of a certain, low-porosity, compact ceramic material, there would arise a problem that a large amount of such costly ceramic material is required, which increases the total cost of the stage.

SUMMARY OF THE INVENTION

It is a primary object of the present invention to provide a supporting mechanism for supporting a reflecting mirror or movable mirror on an object to be measured, in which any displacement of the movable mirror relative to the object may be effectively prevented, which could otherwise be caused by the inertial force due to the movement of the measuring object.

It is another object of the present invention to provide a movable mirror supporting mechanism, in which any harmful deformation of the reflecting surface of the movable mirror may be effectively suppressed.

It is a further object of the present invention to provide a stage having a material piece support or stage body which is inexpensive and has a sufficient rigidity.

It is a still further object of the present invention to provide a stage having a stage body and a movable mirror or reflecting mirror supported on the stage body, in which the stage body has a sufficient rigidity while the movable mirror has a high reflectivity.

According to one aspect of the present invention, there is provided a movable mirror supporting mechanism for supporting a movable mirror forming a part of an interferometric measurement system and having a rectangular cross-section onto an object to be measured with a reflecting surface of the movable mirror being arranged normal to a measuring direction, the movable mirror supporting mechanism including: at least two fixtures for securing the movable mirror from above onto respective movable mirror supporting portions provided on the object; and positions on the movable mirror at which the movable mirror is secured onto the object by the fixtures being defined as being out of that area of the reflecting surface of the movable mirror which is utilized for interferometric measurement.

With this movable mirror supporting mechanism, it is important that the movable mirror is secured from above onto movable mirror supporting surfaces of the object by means of at least two fixtures, and those positions on the movable mirror at which the movable mirror is secured is defined as being out of that area of the reflecting surface of the movable mirror which is utilized for interferometric measurement. By virtue of this, any displacement of the movable mirror relative to the object may be prevented, which displacement could be otherwise caused by the movement of the object. Further, by virtue of the above, any deformation of the movable mirror will be confined to those areas of the measuring surface (or the reflecting surface) of the movable mirror which are out of the area to be utilized for interferometric measurement, resulting in that such deformation of the movable mirror may be prevented from affecting the measurements provided by the interferometer.

According to another aspect of the present invention, there is provided a movable mirror supporting mechanism for supporting a movable mirror forming a part of an interferometric measurement system and having a rectangular cross-section onto an object, with a reflecting surface of the movable mirror being arranged normal to a measuring direction, the movable mirror supporting mechanism including: at least two movable mirror supporting portions provided on the object and spaced apart from each other in a direction perpendicular to the measuring direction, each of said movable mirror supporting portions having a top surface formed as a convex curved surface which gradually rises from the end edges to the center thereof with respect to the measuring direction; and a plurality of fixtures for securing the movable mirror from above onto the object at positions of the at least two movable mirror supporting portions.

With this movable mirror supporting mechanism, it is important that the top surface of each movable mirror supporting surface is so formed as to gradually rise from the end edges to the center thereof with respect to the measuring direction. By virtue of this, when the movable mirror is fixedly secured from above onto the movable mirror supporting surfaces by the fixtures, any harmful deformation of the measuring surface (or the reflecting surface) of the movable mirror may be effectively prevented even if the movable mirror itself is deformed by the stress produced by the fixtures, because there is no portion of the movable mirror supporting surfaces which could prevent or interfere the deformation of the movable mirror by the reaction force from it to the movable mirror.

According to a further aspect of the present invention, there is provided a movable mirror supporting mechanism for supporting a movable mirror forming a part of an interferometric measurement system and having a rectangular cross-section onto an object, with a reflecting surface of said movable mirror being arranged normal to a measuring direction, the movable mirror supporting mechanism including: at least two fixtures for securing the movable mirror from above onto respective movable mirror supporting portions provided on the object, each of said fixtures having a rod portion and a large diameter portion at one end of the rod portion; and the large diameter portion of each fixture having a spherical convex surface facing to a top surface of the movable mirror, wherein the amount of projection of the spherical convex surface toward the top surface of the movable mirror gradually increases from the peripheral portion of the spherical convex surface to the center of the stem.

With this movable mirror supporting mechanism, it is important that the large diameter portion of each fixture has a spherical convex surface facing to an upper surface of the movable mirror, and the amount of projection of the spherical convex surface toward the upper surface of the movable mirror gradually increases from the peripheral portion of the spherical convex surface to the center of the stem. By virtue of this, any nonuniform abutment of the large diameter portion of the fixture may be prevented even when the upper surface of the movable mirror to be secured by the fixture is inclined, so that any local stress concentration due to the nonuniform abutment may be prevented and thus any harmful deformation of the mirror surface of the movable mirror may be prevented.

According to a still further aspect of the present invention, there is provided a movable mirror supporting mechanism for supporting a movable mirror forming a part of an interferometric measurement system and having a rectangular cross-section onto a object, with a reflecting surface of the movable mirror being arranged normal to a measuring direction, the movable mirror supporting mechanism including: at least two movable mirror supporting portions provided on the object and spaced apart from each other in the direction perpendicular to the measuring direction, each of the movable mirror supporting portions having a top surface for supporting the movable mirror; at least two fixtures for securing the movable mirror from above onto the movable mirror supporting portions provided on the object, each of the fixtures having a rod portion and a large diameter portion at one end of the rod portion; attachment holes formed in the measuring object for receiving the fixtures, each attachment hole having a shoulder associated with the large diameter portion of the fixture, the shoulder being inclined with respect to an axis of the fixture; and a pair of ring-shaped edge-abutment-preventing elements disposed in each attachment hole and inserted between the large diameter portion of the fixture and the shoulder of the attachment hole.

According to a yet further aspect of the present invention, there is provided a stage including a movable stage body and a movable mirror secured onto the stage body, wherein the movable mirror is made of a material consisting mainly of a highly compact ceramic material having a relatively low porosity; and the stage body is made of a material consisting mainly of another ceramic material having a higher porosity than the material for the movable mirror.

The ceramic material for the stage body may consist mainly of at least one of ceramic materials selected from the group consisting of alumina ($Al_2O_3$) ceramics, silicon nitride ($Si_3N_4$) ceramics and sialon (Si-Al-O-N) ceramics. Further, the ceramic material for the movable mirror may be created by processing powder of the ceramic material for the stage body through a hot-isostatic-pressing process.

With this stage, only the movable mirror may be made of a highly compact ceramic material which is costly, so that the amount of the highly compact ceramic material can be saved for the material piece support and thus the cost may be reduced over the case where both of the stage body and the movable mirror are made of a highly compact ceramic material. Further, since the stage body is made of a ceramic material, it may have a higher rigidity than a stage body Made of any of glass materials. Moreover, since the movable mirror itself Is made of a highly compact ceramic material, it may enjoy a high reflectivity.

In addition, in the case where the ceramic material for the movable mirror is created by hot-isostatic-pressing the powder of the ceramic material for the stage body, the ceramic material for the movable mirror and that for the stage body will have the identical composition, so that the movable mirror and the stage body may have substantially the same thermal expansion coefficient. By virtue of this, any possible deformation of the mirror surface of the movable mirror due to an environmental temperature change may be effectively suppressed.

BRIEF DESCRIPTION OF THE DRAWINGS

The above and other objects, features and advantages of the present invention will be apparent from the following detailed description of preferred embodiments thereof, reference being made to the accompanying drawings, in which.

DESCRIPTION OF PREFERRED EMBODIMENTS

Referring now to the accompanying drawings, and in particular to FIGS. 2 to 9 thereof, four movable mirror supporting mechanism according to preferred embodiments of the present invention will be described in detail.

Figure 2:
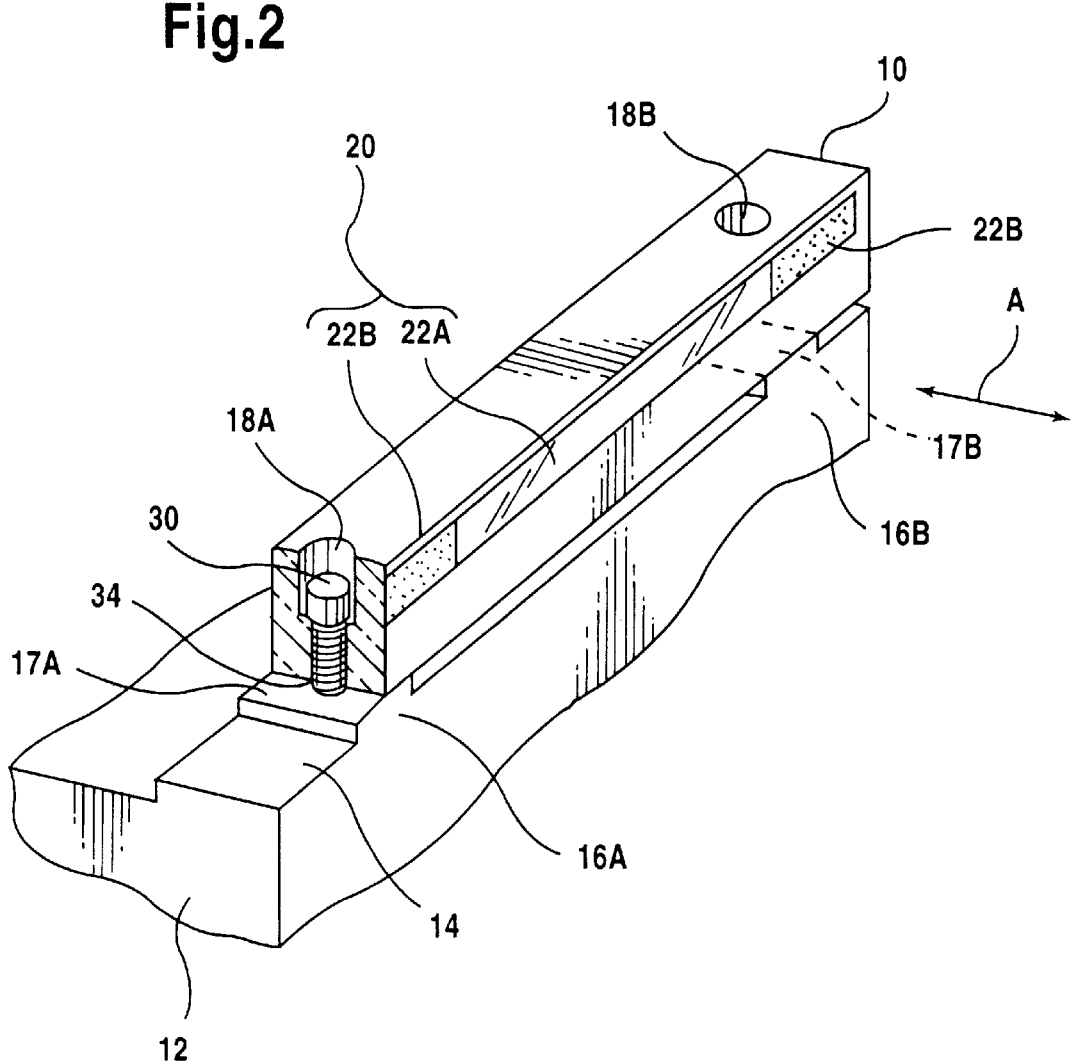
FIG. 2 is a perspective view, partially broken away, of a movable mirror supporting mechanism according to a first embodiment of the present invention.

FIG. 2 shows a movable mirror supporting mechanism according to a first embodiment of the present invention. As shown, the movable mirror supporting mechanism comprises a stage body 12 which is an object whose position is to be measured. The stage body 12 has a belt-like raised portion or attachment portion 14 having a fixed width and extending along one of four side edges of the stage body 12. A pair of movable mirror supporting portions or support protrusions 16A and 16B, which are of rectangular shape in plan view, are provided on the top surface of the attachment portion 14 at positions apart from each other in the longitudinal direction of the attachment portion 14. The support protrusions 16A and 18B have respective bottom supporting surfaces 17A and 17B formed as movable mirror supporting surfaces. A reflecting mirror or movable mirror 10 is supported on the bottom supporting surfaces 17A and 17B so as to extend horizontally. The movable mirror 10 has a pair of attachment holes 18A and 18B formed therein which extend vertically through the movable mirror 10 from the top surface to the bottom surface thereof. The attachment holes 18A and 18B receive respective screws 30 (only one of the screws, which is received in the through hole 18A, is seen in FIG. 2), which have respective threaded ends 30B in threading engagement with associated screw holes 34 formed in the bottom supporting surfaces 17A and 17B of the stage body 12 and thereby are secured to the stage body 12.

The movable mirror 10 has one side thereof (the right-hand side shown in FIG. 2) formed as a reflecting surface 20 or the measuring surface, which a laser beam emitted from a laser interferometer unit (not shown) is incident on and reflected by. The reflecting surface 20 is to be arranged normal to the measuring direction (represented by arrow A in FIG. 2). The movable mirror 10 comprises a glass body having a rectangular cross-section and one side thereof silvered to form the reflecting surface 20.

The entire reflecting surface 20 of the movable mirror 10 shown in FIG. 2 is considered to be divided into three areas including a usable area 22A which may be utilized to reflect the laser beam from the laser interferometer when the stage body 12 is moved to various positions in a plane and two unusable areas 22B which will never be used for the measurement purpose although they are formed to be reflective. (For clarity, the unusable areas 22B are represented by dotted regions in FIG. 2; however, the unusable areas 22B are actually silvered as with the usable area 22A, and form a continuous reflecting surface with the latter. Thus, in fact, there are not visible boundaries between the usable area 22A and the unusable areas 22B.) In this embodiment, the attachment holes 18A and 18B are formed at positions corresponding to the unusable areas 22B of the reflecting surface 20, and thus the movable mirror 10 is fixedly secured onto the stage body 12 by the screws 30 at these positions.

The stage body 12, here, forms a part of a wafer stage used in a demagnification projection exposure apparatus (or so-called "stepper") for the lithographic process in fabrication of semiconductor devices or the like, in which the stepper serves to project an image of a circuit pattern formed on a mask (or reticle) through a projection lens onto a resist-coated photosensitized substrate (such as a wafer). The stepper performs exposure operations to a plurality of exposure sites on a wafer in a sequential manner while the stage body 12 carrying the wafer is stepped to these exposure sites, so that an inertial force acts on the movable mirror 10 due to the acceleration of the stage body 12 when the latter is driven to start and stop its movement (i.e., when an exposure operation is performed), and thus it is required to support the movable mirror 10 on the stage body 12 such that no displacement of the movable mirror 10 may occur relative to the stage body 12. The reflecting surface 20 of the movable mirror 10 thus fixedly secured onto the stage body 12 is used to reflect the laser beam from the laser interferometer (not shown) so as to measure the coordinate positions of the stage body 12, which carries a wafer, with a vary high resolution (about 0.01 $\mu$m).

With the movable mirror supporting mechanism according to the first embodiment of the present invention described above, the movable mirror 10 is secured to the screw holes 34 formed in the bottom supporting surfaces 17A and 17B on the stage body 12 by means of the two screws 30 received in the two attachment holes 18A and 18B formed in and extending through the movable mirror 10, so that the movable mirror 10 can be fixedly secured onto the stage body 12. Accordingly, the movable mirror 10 can never be subject to any displacement relative to the stage body 12, which could otherwise occur due to an inertial force which may be caused by the stage body 12 being driven for stepping movement and act on the movable mirror 10, so that the position measurement using the laser interferometer may be achieved with a very high resolution. Note that the movable mirror is secured onto the stage body by the fixtures (the screws 30 in this embodiment) at two positions, or alternatively it may be at more than two positions, so that any angular displacement of the movable mirror 10 relative to the stage body 12 can be effectively prevented as well.

Further, with the first embodiment described above, the movable mirror 10 is secured by the screws 30 at the positions corresponding to the areas other than the usable area 22A of the reflecting surface 20 of the movable mirror 10 (e.g., to the unusable areas 22B of the reflecting surface 20). Thus, any deformation of the reflecting surface 20, which may result from the deformation of the movable mirror 10 caused by the compression forces acting on it from the tightened screws 30, will be confined to the unusable areas 22B and not affect the usable area 22A at all.

Figure 3:
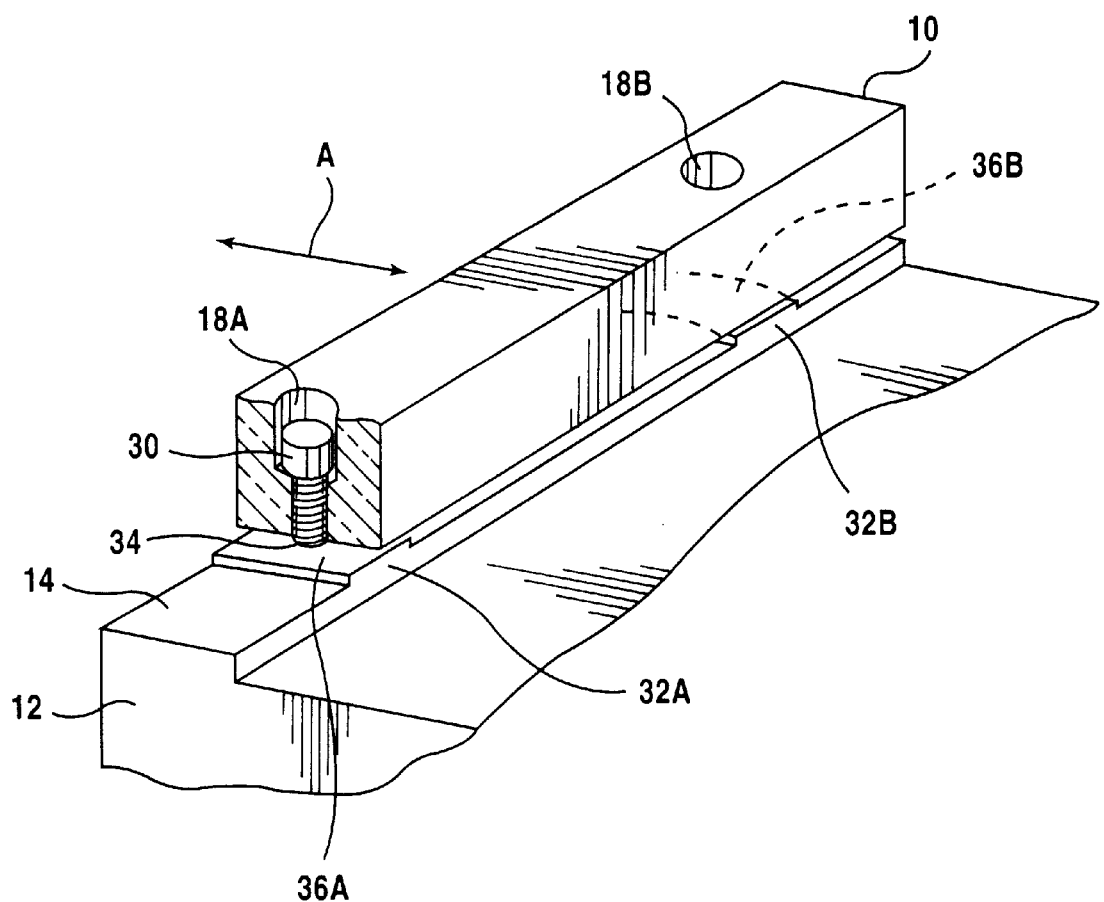
FIG. 3 is a perspective view, partially broken away, of a movable mirror supporting mechanism according to a second embodiment of the present invention.

FIG. 3 shows a movable mirror supporting mechanism according to a second embodiment of the present invention. In FIG. 3, like elements are designated by the same reference numerals as used for the first embodiment shown in FIG. 2 and will not be described in detail.

In the movable mirror supporting mechanism according to the second embodiment, as with the first embodiment, a stage body 12 has an attachment portion 14, and a pair of movable mirror supporting portions of support protrusions 32A and 32B are formed on the top surface of the attachment portion 14. The support protrusions 32A and 32B have respective top surfaces formed as movable mirror supporting surfaces or bottom supporting surfaces 36A and 36B. Unlike the first embodiment, however, the bottom supporting surfaces 36A and 36B are formed as upwardly convex, curved surfaces. More specifically, each bottom supporting surface 36A, 36B is formed as a convex curved surface which gradually rises from the end edges to the center thereof with respect to the measuring direction represented by arrow A in FIG. 3.

Figure 4:
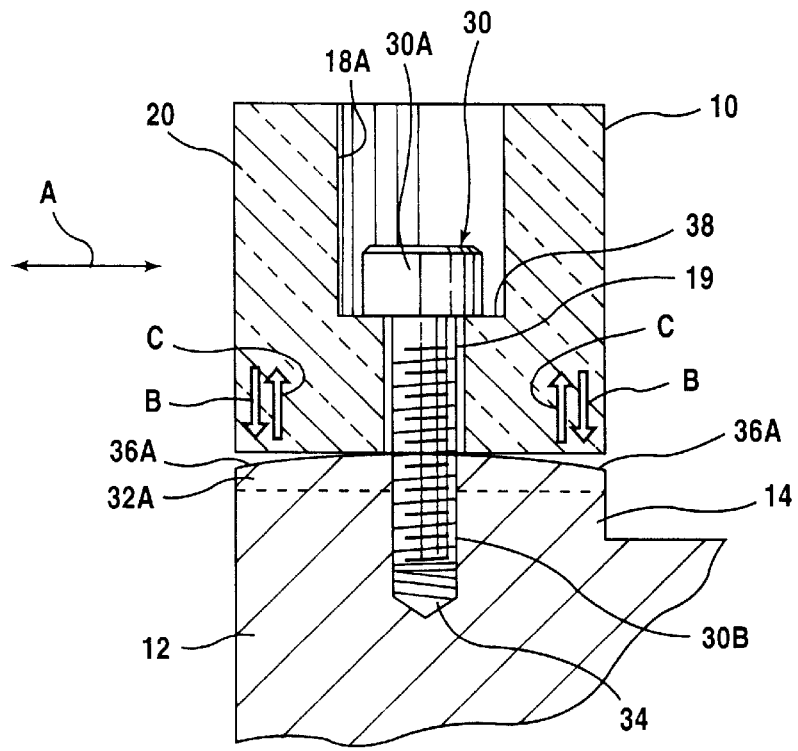
FIG. 4 is an enlarged cross-sectional view of the movable mirror supporting mechanism shown in FIG. 3.

FIG. 4 is an enlarged cross-sectional view showing the movable mirror 10 and the stage body 12 cross-sectioned along a vertical plane on which the axis of the screw 30 lies in order to illustrate the shape of the bottom supporting surface 36A more clearly. As shown in FIG. 4, the bottom supporting surface 36A (or the top surface of the support protrusion 32A), facing to the bottom of the movable mirror 10, is so shaped as to be a convex curved surface in which the height is lowest at positions along both end edges in the measuring direction represented by arrow A, and in which the surface gradually rises from the end edges to the center in the measuring direction at which the screw hole 34 is formed. This curved surface may comprise a cylindrical surface having its axis extending parallel to and in the longitudinal direction of the attachment portion 14, The arrangement of the movable mirror support mechanism shown in FIGS. 3 and 4 will now be described in more detail. The movable mirror 10 has a pair of screw head receiving attachment holes 18A and 18B at positions at which the movable mirror 10 is secured onto the stage body 12 by means of the fixtures. Each attachment hole 18A, 18B has a circular cross-section and extends vertically from the top surface of the movable mirror 10 to a point whose height is about one half of the height of the movable mirror 10. In the bottom of the attachment hole 18A, a vertical through hole 19 is formed which is coaxial with and has a smaller diameter than the attachment hole 18A. (FIG. 4 shows only one attachment hole 18A; the other attachment hole 18B has the identical arrangement and hidden from view in FIG. 4.) The stage body 12, which supports the movable mirror 10, has a pair of movable mirror supporting portions or support protrusions 32A and 32B formed on the top surface of the attachment portion 14 which is formed along one side edge of the stage body 12. A screw hole 34 having a female thread is formed in each of the support protrusions 32A and 32B at a position substantially at the center of that support protrusions in the measuring direction (represented by arrow A in FIG. 4). The female thread of the screw hole 34 is formed for threading engagement with the male threaded portion 30B of the fixture or screw 30. The fixture or screw 30 has a large diameter portion or head 30A and the rod or threaded portion 30B integral with and extending downwardly from the head 30A. The threaded portion 30B having a smaller diameter than the head 30A.

The movable mirror 10 is placed on the bottom supporting surfaces 36A and 36B of the stage body 12, with the screw holes 34 formed at the bottom supporting surfaces 36A and 36B being aligned with the corresponding through holes 19 formed in the movable mirror 10. Then, the screws 30 are inserted in the corresponding attachment holes 18A and 18B, the stems 30B of the screws 30 are brought into threading engagement with the corresponding screw holes 34, and the screws 30 are tightened to complete the securing of the movable mirror 10 onto the stage body 12.

When the movable mirror 10 is secured onto the stage body 12 in this manner, if the stage body 30 is made of a highly rigid metallic material and the movable mirror 10 made of a glass material having a relatively low rigidity is compressed against the stage body by the tightened screw 30 at the position near the center of the movable mirror 10, the movable mirror 10 is subject to stress deformation which stretches vertically at both end of the movable mirror 10 in the measureing direction (the direction of arrow A). If the bottom supporting surfaces 32A and 32B are flat(prior art), then forces would act on such flat bottom support surfaces from the bottom of the movable mirror 10 deformed at both sides as shown by arrows B in FIG. 4. Nevertheless, since the bottom supporting surfaces made of a metallic material, would subject to almost no deformation, the reaction forces would act on the movable mirror 10 from such bottom supporting surfaces (as represented by arrows C in FIG. 4) to lead to some harmful deformation of the mirror surface 20 of the movable mirror 10.

In contrast, with the moving mirror supporting mechanism according to the second embodiment of the present invention, because the bottom supporting surfaces 36A and 36B are formed as convex curved surfaces (see FIG. 4), there are gaps defined between the edges of the bottom supporting surfaces 36A and 36B and the associated edges of the bottom of the movable mirror 10. By virtue of the gaps, any possible deformation of the movable mirror 10 will be free from any constraint, resulting in no reaction force acting from the bottom supporting surface 36A to the movable mirror 10 (as represented by arrows C), and thus the reflecting surface 20 of the movable mirror 10 may be free from any harmful deformation due to such reaction force.

Note that in FIG. 4 the curvature of the bottom supporting surface 36A of the support protrusion 32A is shown with exaggeration for easier understanding. Actually, the movable mirror 10 will subject to only a very small deformation, and the bottom supporting surfaces 36A and 36B have a small curvature corresponding to such very small deformation.

Figure 5:
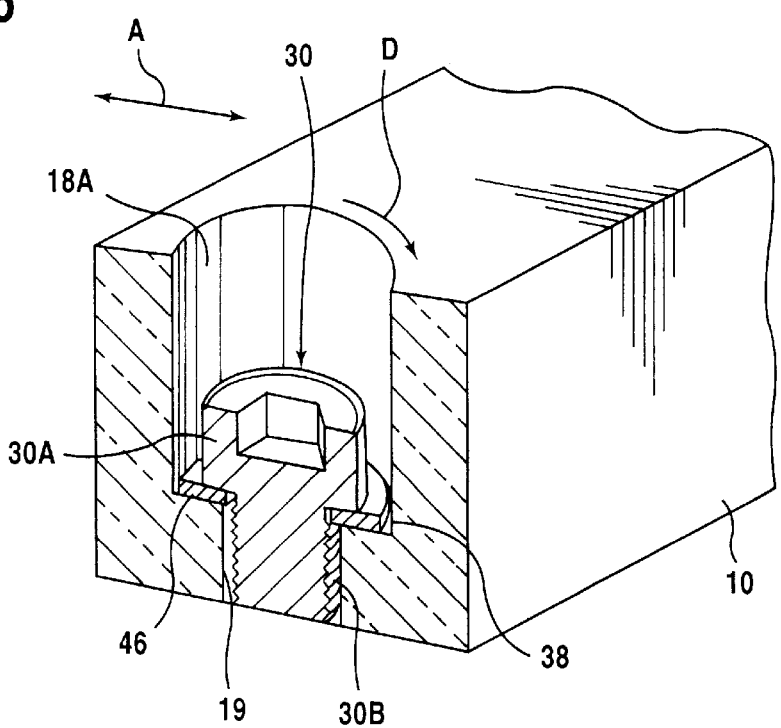
FIG. 5 is a perspective view, partially broken away, of a major portion of a movable mirror supporting mechanism according to a third embodiment of the present invention.

FIG. 5 shows an arrangement of a movable mirror supporting mechanism according to a third embodiment of the present invention. In FIG. 5, like elements are designated by the same reference numerals as used in FIGS. 2 to 4 and will not be described in detail.

The third embodiment has a feature that, as shown in FIG. 5, a slip element 46 is provided between i) the head 30A of fixture or screw 30 and ii) the bottom or shoulder 38 of the attachment hole 18A, in order to reduce any torque acting on the bottom 38 of the attachment hole from the head 30A of the screw 30.

The slip element 46 comprises a washer-like plate made of a suitable low-friction synthetic resin, such as teflon (trademark of DuPont). Of course, the slip element 46 is not limited to such a resin washer but may be formed in any of various other forms which may reduce any frictional force acting between the screw 30 and the bottom 38 of the hole 18A of the movable mirror 10. For example, the slip element 46 may comprise a metal washer with an appropriate lubricant applied on its surfaces, or may comprise a stack of slippery films.

With this movable mirror supporting mechanism, as shown in FIG. 5, when the screw 30 is rotated right-handed (i.e., in the rotational direction shown by arrow D) to tighten the screw 30 so as to fix the movable mirror 10 onto the stage body 12, the head 30A of the screw 30 slides against the top surface of the slip element 46 and/or the bottom surface of the slip element 46 slides against the bottom or shoulder 38 of the attachment hole 18A of the movable mirror 10, which may effectively reduce any frictional force acting between the head 30A and the bottom or shoulder 38 of the attachment hole 18A. Thus, the slip element 46 has the effect of reducing any frictional force acting between the head 30A and the shoulder 38, with the result that any torque acting on the shoulder 38 of the attachment hole 18A of the movable mirror 10 from the screw 30 being tightened may be substantially reduced.

Accordingly, by virtue of the arrangement in which the movable mirror 10 is secured onto the stage body 12 with the slip element 46 inserted between each screw 30 and the movable mirror 10, any torque acting on the movable mirror 10 from each screw 30 being tightened may be substantially reduced, so that any twisting deformation of the movable mirror 10 which may be produced in the direction of arrow D due to such torque may be reduced, and thereby any harmful deformation of the reflecting surface 20 may be practically prevented.

Figure 6:
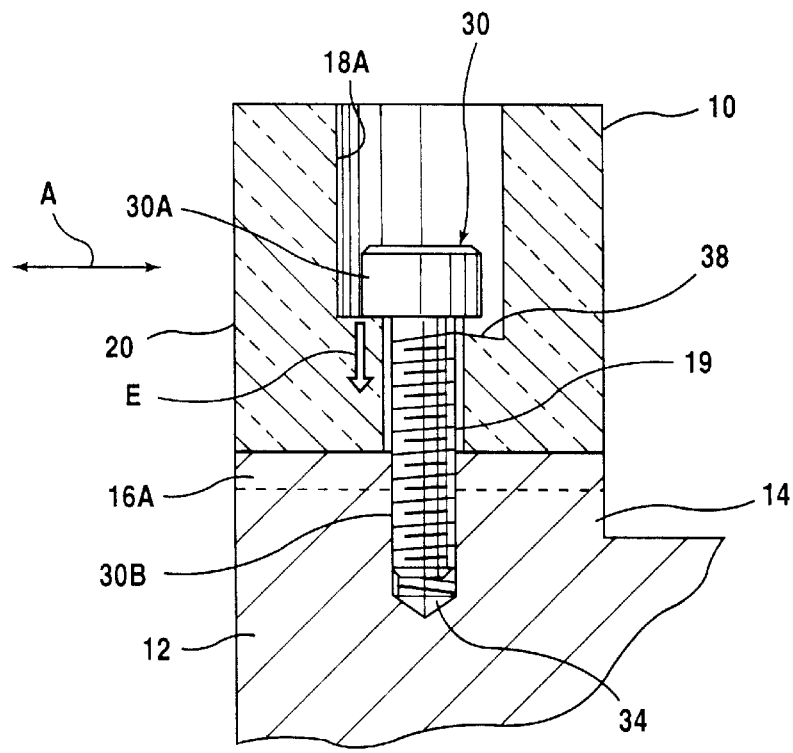
FIG. 6 is a cross-sectional view of a movable mirror illustrating the condition of edge-abutment of the screw for securing the movable mirror.
Figure 7:
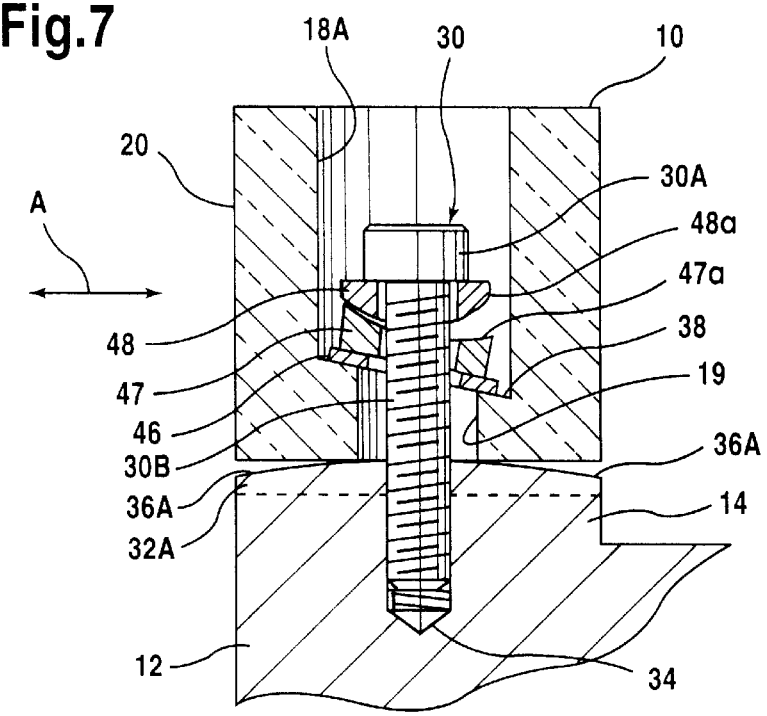
FIG. 7 is a cross-sectional view of a major portion of a movable mirror supporting mechanism according to a fourth embodiment of the present invention.

FIG. 6 shows an arrangement in which an attachment hole 18A of a movable mirror 10 has a bottom or shoulder 38 which is not normal but inclined with respect to the axis of the attachment hole 18A and movable mirror 10 is fixedly secured onto a stage body 12 by means of ordinary screws 30. FIG. 7 shows an arrangement of a movable mirror supporting mechanism according to a fourth embodiment of the present invention. In FIGS. 6 and 7, like elements are designated by the same reference numerals as used in FIGS. 2 to 5 and will not be described in detail.

The movable mirror supporting mechanism according to the fourth embodiment has a feature that, as shown in FIG. 7, a pair of ring-shaped edge-abutment-preventing elements 47 and 48, facing to each other, are inserted between the head 30 of the screw 30 and the bottom or shoulder 38 of the attachment hole 18A of the movable mirror 10. The edge-abutment-preventing elements 47 and 48 serve to prevent nonuniform abutment of the head 30A of the screw 30 with the shoulder 38 of the attachment hole 18A even when the shoulder 38 is not normal but inclined with respect to the axis of the attachment hole 18A. Here, the "edge-abutment" of the screw head means the abutment of a partial edge of the head 30A of the screw 30 with a partial area on the inclined shoulder 38 of the attachment hole 18A, such as shown in FIG. 6, which may occur when the shoulder 38 is inclined and a screw 30 having a head 30A of an ordinary shape (cylindrical or hexagonal) is used to fix the movable mirror 10 onto the stage body 12. The partial area on the shoulder 38 at which the partial edge of the head 30A of the screw 30 is in abutment with the shoulder 38 is subject to the concentration of the thrust force applied from the screw head 30A (the direction of the thrust force is represented by arrow E in FIG. 6), so that an uneven stress distribution will occur in the movable mirror 10 and that the concentration of the stress may occur at a position adjacent to the reflecting surface 20 of the movable mirror 10. Under this situation, the effect of the deformation of the movable mirror 10 would have to be taken into consideration.

In view of the foregoing, the fourth embodiment comprises the pair of ring-shaped edge-abutment-preventing elements 47 and 48, in which one element 47 has a spherical concave top surface 47a and the other element 48 has a spherical convex bottom surface 48a. The central holes of the ring-shaped elements 47 and 48 receive the rod or threaded portion 30B of the screw 30. The radius of curvature of the spherical concave bottom surface 47a is preferably the same as or slightly greater than that of the spherical convex top surface 48a.

Accordingly, the spherical convex surface 48a extends just under the head 30A of the screw 30 and around the stem 30B of the screw 30. Further, the amount of projection of the spherical convex surface 48a toward the bottom 38 of the attachment hole 18A gradually increases from the peripheral portion of the surface 48a to the stem 30B of the screw 30. On the other hand, the spherical concave surface 47a, which faces to the spherical convex surface 48a, extends around the stem 30B of the screw 30, with the depth of the spherical concave surface 47a increasing from the peripheral portion of the surface 47a to the stem 30B of the screw 30 extending at the center of the surface 47a. When the screw 30 is tightened, the spherical convex surface 48a and the spherical concave surface 47a are brought into abutment with each other. If the bottom or shoulder 38 of the attachment hole 18A is not normal to the axis of the screw 30, then the abutment point between the spherical surfaces 48a and 47a will be automatically adjusted, so that any edge-abutment of the screw head 30A may be effectively prevented and the thrust force applied by the screw head 30A may be distributed over a wide area on the bottom or shoulder 38 of the attachment hole 18A so as to prevent any stress concentration thereon.

The movable mirror supporting mechanism according to the fourth embodiment of the present invention comprises not only the arrangement for preventing edge-abutment just described, but also all the features previously described with reference to the movable mirror supporting mechanisms according to the first, second and third embodiments of the present invention.

More specifically, the movable mirror 10 shown in FIG. 7 is fixedly secured onto the stage body 12 by means of two screws (only one screw 30 is shown in FIG. 7; the other screw is hidden from view) tightened, which are in threading engagement with corresponding two screw holes 34 formed in associated two bottom supporting surfaces (only one bottom supporting surface 36A is shown in FIG. 7; the other bottom supporting surface 36B is hidden from view), respectively, of the stage body 12. Although not shown in FIG. 7, those positions at which the movable mirror 10 is fixedly secured by the screws 30 are defined according to the same criterion as used in the first embodiment shown in FIG. 2, i.e., such positions are defined to correspond to the areas other than the usable area 22A of the reflecting surface 20 (e.g., to the unusable areas 22B of the reflecting surface 20).

Further, in the fourth embodiment, as with the second embodiment shown in FIGS. 3 and 4, the stage body 12 has a projecting attachment portion 14 formed on one end the stage body 12 and a pair of movable mirror supporting portions or support protrusions 32A (see FIG. 3 for the other support protrusion 32B) are provided on the top surface of the attachment portion 14 at positions apart from each other for supporting the movable mirror 10 in the vertical direction. The support protrusion 32A have respective bottom supporting surfaces 36A (see FIG. 3 for the other supporting protrusion 36B) of cylindrical shape. The movable mirror 10 is supported on the bottom supporting surface 36A. Each of the bottom supporting surfaces Is formed as a convex curved surface which gradually rises from the end edges to the center thereof with respect to the measuring direction (represented by arrow A) of the interferometric measurement system.

Moreover, in the fourth embodiment, as with the third embodiment shown in FIG. 5, a slip element 46 is inserted between the bottom 38 of the attachment hole 18A formed in the movable mirror 10 shown in FIG. 7 and the bottom of the lower edge-abutment-preventing element 47 in order to reduce any frictional force acting between them.

As understood from the above, the movable mirror supporting mechanism according to the fourth embodiment has not only the features specific to itself but also those features which are seen in the first, second and third embodiments described above, so that the fourth embodiment can provide the combination of all the desirable effects which may be obtained by virtue of such features.

Figure 1:
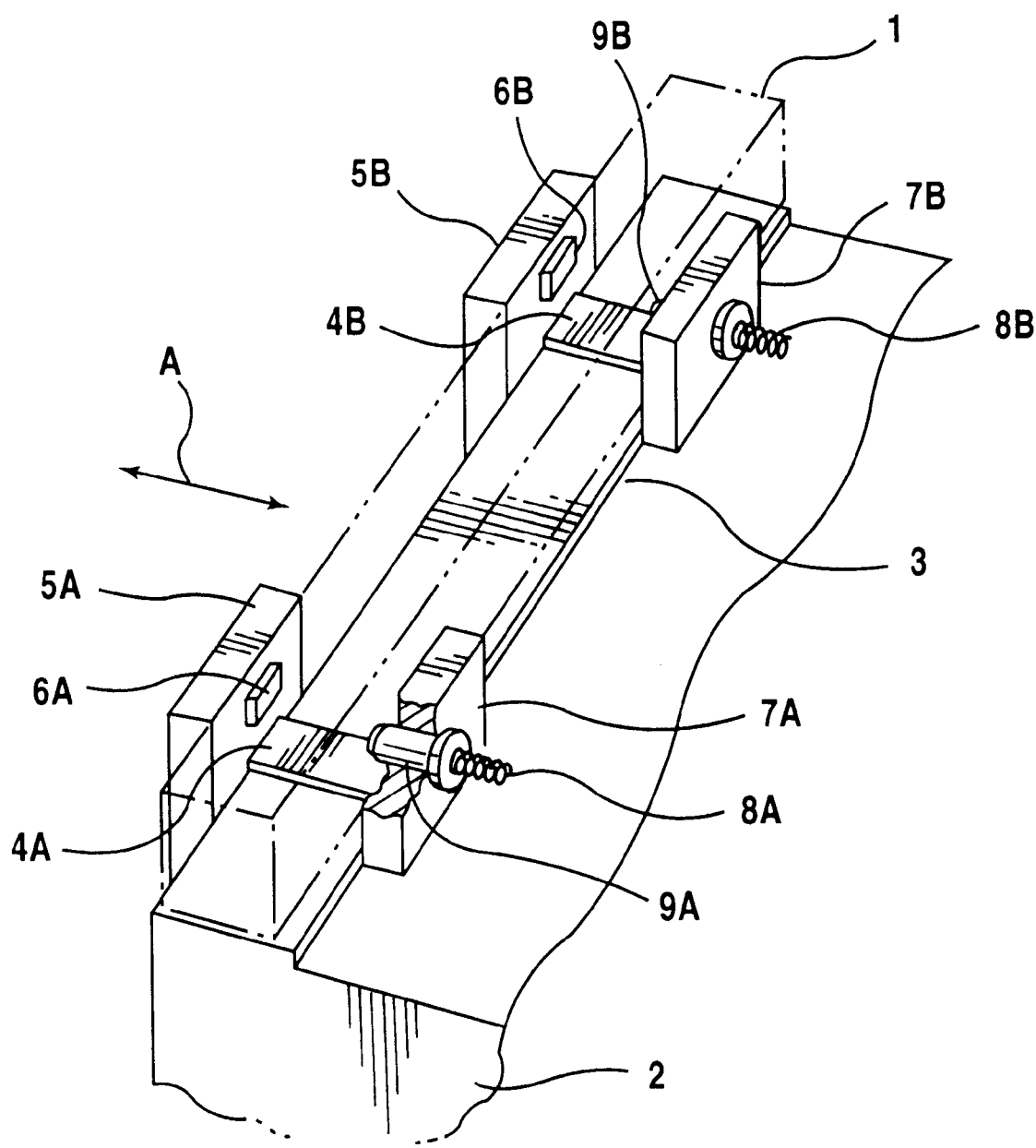
FIG. 1 is a perspective view of a typical conventional movable mirror supporting mechanism.

More specifically, with the movable mirror supporting mechanism according to the fourth embodiment shown in FIG. 7, the movable mirror 10 is secured onto the stage body 12 by means of two screws 30, so that any displacement of the movable mirror 10 relative to the stage body 12 may be prevented with reliability; such displacement could otherwise be caused by the inertial force acting to the movable mirror 10 due to its acceleration occurring when the stage body 12 is driven to start of stop moving. In addition, with the fourth embodiment, the movable mirror 10 is fixed by the screws 30 at the positions corresponding to the areas other than the usable area 22A of the reflecting surface 20 of the movable mirror 10 (see FIG. 1), so that any deformation of the reflecting surface 20, which may result from the deformation of the movable mirror 10 caused by the compression forces acting on it from the tightened screws 30, will be confined to the unusable areas 22B and not affect the usable area 22A at all.

Further, with the fourth embodiment, because of the tightening of the screws 30 in order to-fixedly secure the movable mirror 10 onto the stage body 12, the movable mirror 10 may subject to such deformation that tends to stretch in the vertical direction at both sides of the movable mirror 10 in the measuring direction (represented by arrow A). Nevertheless, since the bottom supporting surfaces 36A and 36B are formed as convex curved surfaces and thus are out of contact with the bottom of the mirror 10 at regions along both sides of the movable mirror 10, such deformation of the movable mirror 10 is not suppressed by the bottom supporting surfaces 36A and 36B at all, resulting in that no secondary stress will occur in the movable mirror 10 due to the reaction forces which could otherwise be applied to the movable mirror 10 from the bottom supporting surfaces 36A and 36B, and thereby any harmful deformation of the mirror surface 20 may be effectively prevented.

Moreover, with the fourth embodiment, the slip element 46 made of a suitable material such as a synthetic resin is inserted between the bottom 38 of the attachment hole 18A formed in the movable mirror 10 and the bottom of the lower edge-abutment-preventing element 47 so as to reduce any frictional force acting between them. By virtue of this, any rotational moment (or torque) acting on the bottom 38 of the attachment hole 18A from the screw 30 being tightened for fixedly securing the mirror 10 to the bottom supporting surface 36A of the stage body 12, may be substantially reduced. This reduction in the rotational moment provides the effect of reducing the stress which may be induced by the rotational moment, so that any harmful deformation of the reflecting surface 20 may be effectively prevented.

In addition, as shown in FIG. 7, between the slip element 46 and the head 30A of the screw 30, there are provided the edge-abutment-preventing element 47 having the spherical concave surface 47a and the edge-abutment-preventing element 48 having the spherical convex surface 48a, with the spherical surfaces 47a and 48a facing to each other. By virtue of this, even when the shoulder 38 is inclined and/or the axis of the screw hole 34 is inclined with respect to the associated bottom supporting surface 36A, 36B so that the screw 30 in engagement with the screw hole is inclined, the point of abutment between the spherical concave surface 47a of one element 47 and the spherical convex surface 48a of the other element 48 may be automatically adjusted depending on the angles of these tilts so as to prevent any edge-abutment, and thereby any harmful deformation of the reflecting surface 20 of the movable mirror 10 may be effectively prevented.

Figure 8:
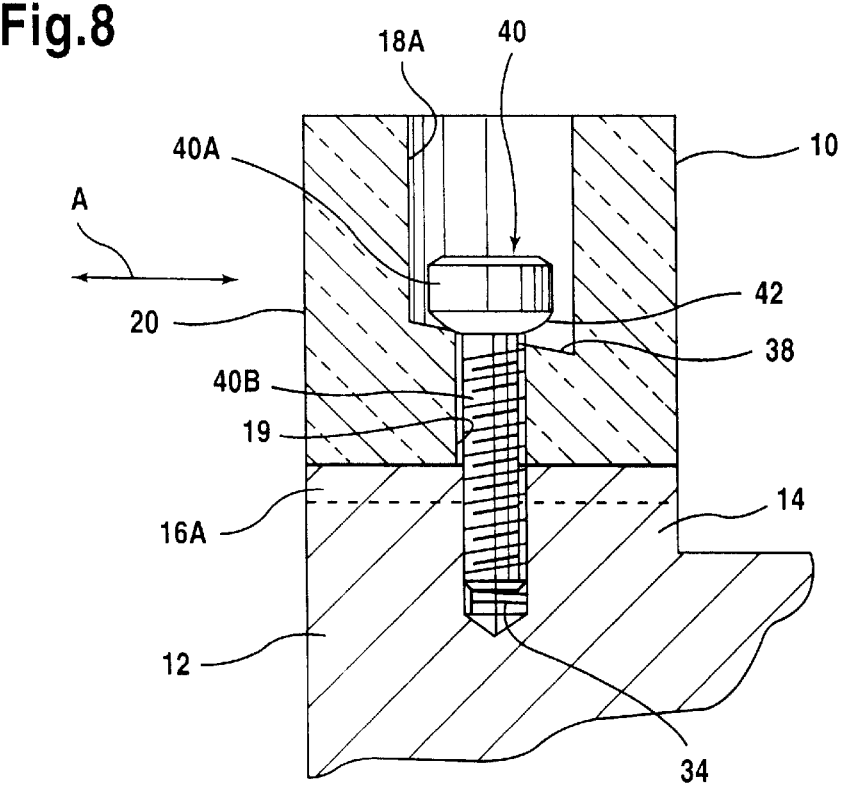
FIG. 8 is a cross-sectional view of a major portion of a movable mirror supporting mechanism according to a first modification to the fourth embodiment of the present invention.

Now, modifications to the fourth embodiment above will be described. FIG. 8 shows a movable mirror supporting mechanism in which a simpler arrangement is used to prevent the edge-abutment which could otherwise occur due to the inclination of the shoulder 38 of the attachment hole 18A of the movable mirror 10. More specifically, this movable mirror supporting mechanism has a feature that the movable mirror 10 is secured by means of such screws 40 in which each screw 40 has a head 40A whose bottom surface 42, facing the shoulder 38 of the attachment hole 18A of the movable mirror 10, is formed as a spherical convex surface projecting toward the shoulder 38 and the projection amount of the spherical convex surface toward the shoulder 38 of the attachment hole 18A gradually increases from the peripheral portion of the spherical convex surface to the center of a stem 40B of the screw 40.

By virtue of the spherical convex shape of the bottom surface 42 of the head 40A of the screw 40, any edge-abutment of the head 40A against the shoulder 38 of the attachment hole 18A of the movable mirror 10 may be avoided even when the shoulder 38 is at a tilt with respect to the axis of the attachment hole 18A, because when the screw 40 is tightened the boundary portion of the screw 40 between its head 40A and stem 40B always come into abutment with the inner edge portion of the shoulder 38 near the screw hole 34. As a result, any harmful deformation of the mirror surface 20 of the movable mirror 10 may be effectively prevented.

Figure 9:
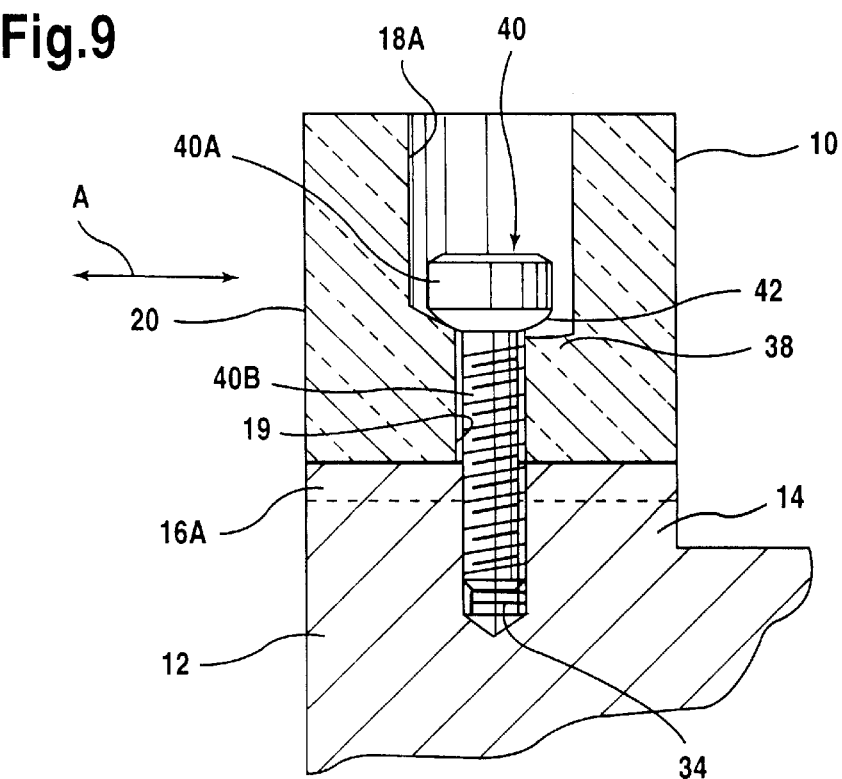
FIG. 9 is a cross-sectional view of a major portion of a movable mirror supporting mechanism according to a second modification to the fourth embodiment of the present invention.

FIG. 9 shows another modification to the fourth embodiment. The modification of FIG. 9 is identical to that of FIG. 8 above except that the shoulder 38 of the attachment hole 18A is formed as a spherical concave surface. With this modification, any partial or localized abutment of the edge of the screw head 40A against the shoulder 38 may be effectively prevented as well.

As understood from the above, with each and any of the movable mirror supporting mechanisms according to the first to fourth embodiments of the present invention described above, i) the movable mirror is secured onto the stage body so that any displacement of the former relative to the latter may be effectively prevented, ii) any deformation of the movable mirror which may be produced by the compression forces applied from the fixtures of screws being tightened may be minimized and iii) any harmful deformation of the reflecting surface of the movable mirror which may be produced by possible deformation of the movable mirror may be minimized. By virtue of these, the position measurement by the laser interferometric measurement system may be achieved with very high resolution.

In each of the embodiments described above, the movable mirror is fixedly secured onto the stage body by means of two fixtures or screws. Alternatively, three or more fixtures may be used for this purpose. In such cases, it is preferable that the positions at which the movable mirror is secured by such fixtures be confined to areas other than the usable area where the reflecting surface of the movable mirror is utilized for interferometric measurement.

Further, in each of the embodiments described above, the fixtures comprise screws. Alternatively, the fixtures may comprise any other suitable means including rivets.

In some of the embodiments described above, a slip element is inserted between the screw and the movable mirror in order to reduce any torque acting on the movable mirror from the screw when the latter is tightened for securing the movable mirror onto the stage body. Alternatively, instead of using such a slip element, at least one of the surfaces of the screw and of the movable mirror contacting with each other may be coated with a layer of a suitable low-friction material such as teflon (trademark of DuPont) or may have a suitable lubricant applied.

In the fourth embodiment described above, as shown in FIG. 7, the elements having the spherical concave and convex surfaces 47a and 48a, respectively, are inserted, together with the slip element 46, between the screw and the movable mirror. As one possible modification to this, the elements 47 and 48 may be made of a suitable low-friction material such as a certain synthetic resin so as to eliminate the slip element 46.

In the modifications to the fourth embodiment described above, the bottom surface 42 of the head 40A of the screw 40 is formed as a spherical convex surface. Alternatively, the bottom surface 42 may be formed to have any of various other suitable shapes, including contiguous curved surfaces and conical surfaces.

Each of the embodiments described above shows an exemplified application of the present invention to an exposure apparatus for the step-and-repeat exposure operation. The applications of the present invention, however, are not limited to such as exposure apparatus. In fact, the present invention may be also applicable to various other types of exposure apparatus including those for the step-and-scan exposure operation. Further, the present invention may be conveniently and desirably applicable to many devices and apparatus using an interferometric measurement system for the purpose of position measurement.

As is clearly understandable from the above, according to the movable mirror supporting mechanisms of the above described embodiments, the movable mirror is secured onto the object to be measured so that any displacement of the movable mirror relative to the object may be effectively prevented, while any harmful deformation of the reflecting surface, which may possibly be caused by the deformation of the movable mirror itself resulting from the stress induced in the movable mirror when it is fixed onto the stage body, may be effectively minimized.

Now, a stage according to a preferred embodiment of the present invention will be described. The stage is a wafer stage used in a projection exposure apparatus for use in fabrication of semiconductor integrated circuit chips.

Figure 10:
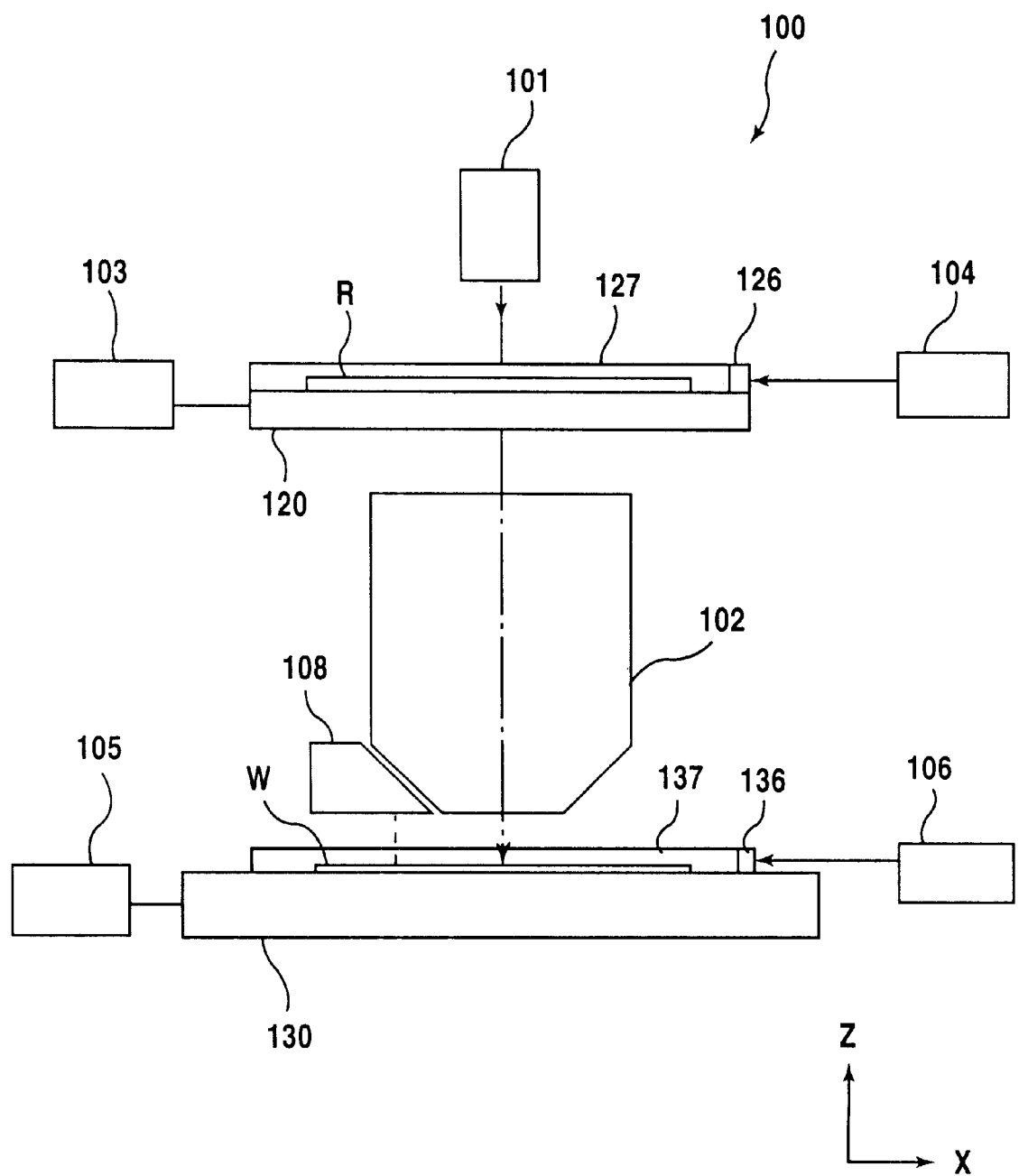
FIG. 10 is a schematic representation showing a projection exposure apparatus using a stage according to an embodiment of the present invention.

FIG. 10 shows the projection exposure apparatus 100 using the wafer stage according to the present invention. The projection exposure apparatus 100 is a scanning projection exposure apparatus, in which a reticle R and a wafer W are scanned in synchronism with each other and relative to the exposure light beam and a pattern formed on the reticle R is sequentially transferred onto a plurality of exposure sites on the wafer W. The projection exposure apparatus 100 is a so-called "scanning stepper".

As shown in FIG. 10, the reticle R is vacuum-chucked onto a reticle stage 120 and an illumination optical system 101 including a light source emits an exposure light beam so as to illuminate the pattern bearing surface of the reticle R with a substantially uniform illuminance distribution. The reticle stage 120 is capable of translational and rotational movements in an XY-plane by means of a reticle drive unit 103, where the XY-plane is defined as a plane perpendicular to the Z-axis which is coincident with the optical axis of a projection optical system 102. The reticle stage 120 has reflecting mirrors or movable mirrors 126 and 127 fixedly secured thereon for interferometric position measurement. One movable mirror 126 is used together with an interferometer 104 so as to measure a position in the X-direction (i.e., the left and right direction on the sheet surface) of the reticle stage 120. More specifically, the interferometer 104 emits a laser beam to the movable mirror 126, and the reflected beam from the movable mirror 126 is used for measuring the position of the reticle stage 120 in the X-direction. Similarly, the other movable mirror 127 is used together with a second interferometer (not shown) so as to measure the position of the reticle stage 120 in the horizontal direction perpendicular to the sheet surface.

With the exposure light beam being illuminated to the pattern formed on the reticle R, the pattern is transferred through the projection lens 102 onto the wafer W which is vacuum-chucked onto the wafer stage 130 (a wafer holder 134 of the wafer stage 130).

The wafer stage 130 has reflecting mirrors or movable mirrors 136 and 137 fixedly secured thereon for interferometric position measurement. One movable mirror 136 is used together with an interferometer 106 so as to measure the position of the wafer stage 130 in the X-direction. More specifically, the interferometer 106 emits laser beams to the movable mirror 136 and to a fixed mirror (not shown) provided for the projection optical system 102, respectively, and the interference between the reflected beams from the fixed mirror and from the movable mirror 136, respectively, is used for measuring the position of the wafer stage 130 in the X-direction. Similarly, the other movable mirror 137 is used together with another interferometer (not shown) so as to measure the position of the wafer stage 130 in the Y-direction.

The wafer stage 130 is capable of three-dimensional translational movement, i.e., translational movement in X-, Y- and Z-directions, by means of a wafer drive unit 105. An alignment microscope 108 is disposed on a side of the projection lens 102. The alignment microscope 108 is of the off-axis type, in which the optical axis of the microscope is not coincident with that of the projection lens 102. The alignment microscope 108 is used to detect a predetermined alignment marks (not shown) from a plurality of areas on the wafer W. The positions of the alignment marks thus detected are processed using the known least-square-approximation method so as to abtain the position (or coordinates) of the wafer W. Further, the baseline amount, which is the distance between the optical axis of the alignment microscope 108 and that of the projection lens 102, is determined and used to move or displace the wafer stage 130 by that amount when the exposure operation sequence for the wafer W starts.

Figure 11:
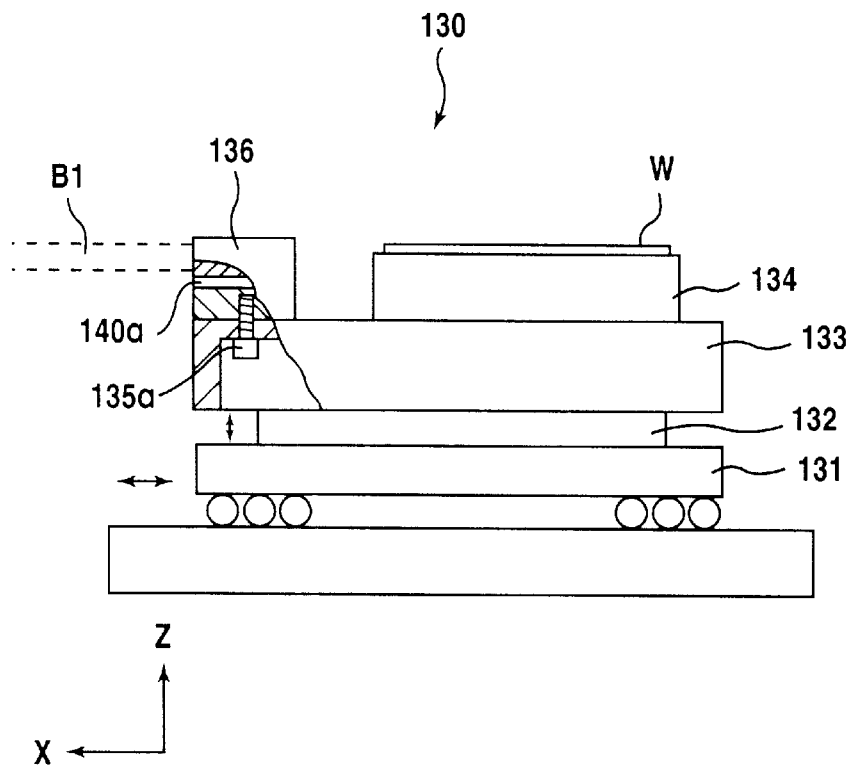
FIG. 11 is a schematic frontal view of the stage of FIG. 10 for carrying a wafer (as viewed from the side opposite to that shown in FIG. 10)
Figure 12:
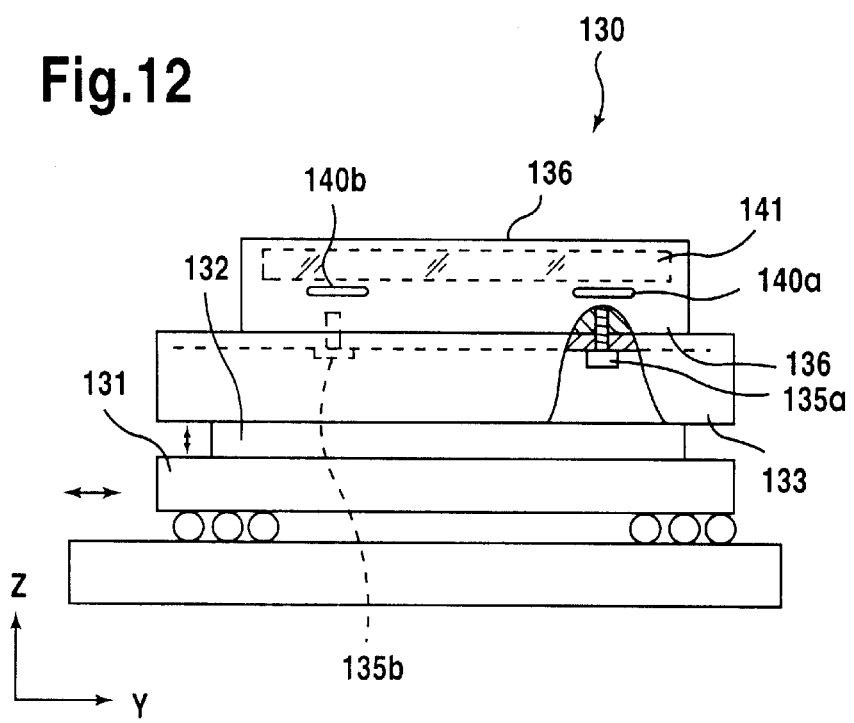
FIG. 12 is a schematic side elevation of the stage of FIG. 10.
Figure 13:
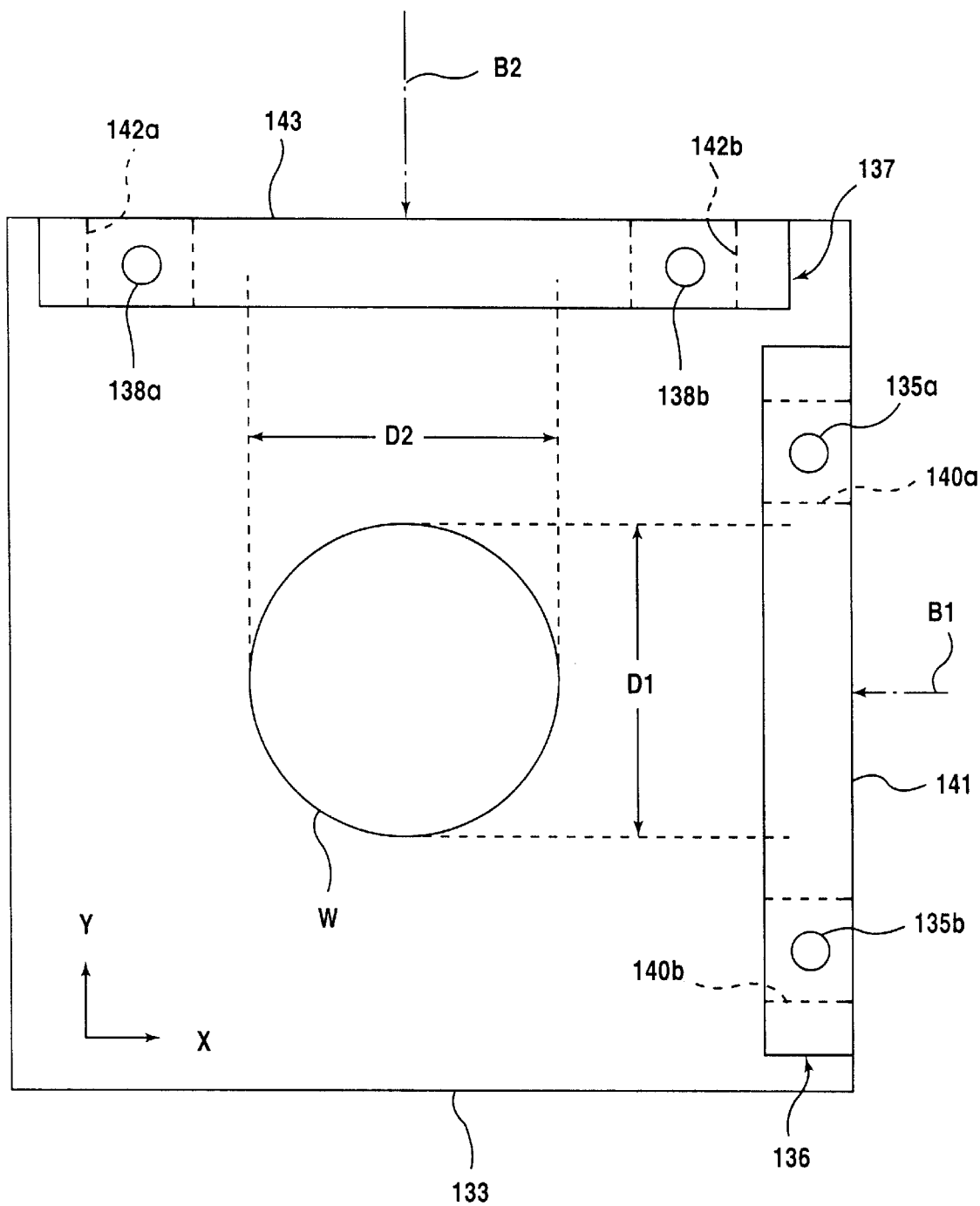
FIG. 13 is a schematic plan view of the stage of FIG. 10.

FIG. 11 shows a frontal view of the wafer stage 130 (as viewed from the side opposite to that shown in FIG. 10), and FIG. 12 shows a side elevation of the wafer stage 130 (as viewed from the right-hand side in FIG. 10). FIGS. 11 and 12 do not show the movable mirror 137 shown in FIG. 10. Further, the movable mirror 137 will not be described in detail since it has the arrangement similar to that of the movable mirror 136. FIG. 13 illustrates the position of the wafer W relative to the movable mirrors 136 and 137 on the wafer stage 130.

In FIGS. 11 and 12, the stage body 133 is capable of movement in an XY-plane by means of an XY-stage 131. The stage body 133 is also capable of movement in the Z-direction and the vertical direction by means of a Z-stage 132. The wafer W is placed on the stage body 133 through a wafer holder 134.

The movable mirror 136 is secured directly to the stage body 133 by a pair of set screws 135a and 135b. More specifically, the set screws 135a and 135b are inserted from underside of the stage body 133 into respective holes formed in the stage body 133, and brought into threading engagement with respective screw holes formed in the bottom of the movable mirror 136. By virtue of this arrangement, the strength of the connection between the movable mirror 136 and the stage body 133 is improved over any of various conventional connections between them, so that any possible displacement of the movable mirror 136 relative to the stage body 133, which may occur due to acceleration or deceleration of the stage body 133 when it is moved, can be effectively minimized. The movable mirror 136 has a pair of slits 140a and 140b formed therein at positions just above the positions corresponding to the set screws 135a and 135b. The slits 140a and 140b extend through the movable mirror 136 in the direction of a laser beam B1 emitted from the associated interferometer unit 106. In this manner, the slits 140a and 140b are formed between a portion of the movable mirror 136 which bears the reflecitng surface 141, and respective portions of the movable mirror 136 at which the movable mirror 136 is secured onto the stage body 133 by the set screws 135a and 135b. This results in that any deformation of the movable mirror 136, which may be caused by the set screws 135a and 136b being or having been tightened in order to secure the movable mirror 136 onto the stage body 133, will not propagate to the reflecting surface 141 of the movable mirror 136. The number and the size of the slits formed for this purpose may be modified depending on relevant factors, including the size of the movable mirror to be secured, for example.

As shown in FIG. 13, like the reflecting mirror or movable mirror 136 described above, the other reflecting mirror or movable mirror 137 is also secured directly to the stage body 133 by a pair of set screws 138a and 138b. By virtue of this arrangement, the strength of the connection between the movable mirror 137 and the stage body 133 is improved over any of various conventional connections between them, so that any possible displacement of the movable mirror 137 relative to the stage body 133, which may occur due to acceleration or deceleration of the stage body 133 when it is moved, can be effectively minimized. The movable mirror 137 has a pair of slits 142a and 142b formed therein at positions just above the positions corresponding to the set screws 138a and 138b. The slits 142a and 142b extend through the movable mirror 137 In the direction of a laser beam B2 emitted from the associated interferometer unit (not shown). In this manner, the slits 142a and 142b are formed between a portion of the movable mirror 137 which bears the reflecting surface 143 and respective portions of the movable mirror 137 at which the movable mirror 137 is secured onto the stage body 133 by the set screws 138a and 138b. As with the movable mirror 136 described above, this results in that any deformation of the movable mirror 137, which may be caused by the set screws 138a and 138b being or having been tightened in order to secure the movable mirror 137 onto the stage body 133, will not propagate to the reflecting surface 143 of the movable mirror 137.

As shown in FIG. 13, the position of the set screws 135a and 135b on the movable mirror 136 are defined to be out of the maximum usable area D1 of the movable mirror 136. More specifically, the positions of the set screws 135a and 135b on the movable mirror 136 are defined to be out of that area of the reflecting surface 141 which is taken in the longitudinal direction of the movable mirror 136 (or the Y-direction) and within which the laser beam B1 can be incident on the mirror surface 141. The positions are defined in this manner since any deformation of the movable mirror 136 which may be produced when the set screws 135a and 135b are tightened in order to secure the movable mirror 136 onto the stage body 133 will have maxima at the positions of the set screws 135a and 135b. Thus, by defining the positions of the set screws 135a and 135b as shown in FIG. 13, any harmful deformation of the reflecting surface 141 of the movable mirror 136 may be minimized, resulting in that any possible error in the measured values produced from the interferometer unit 106 due to such deformation may be minimized. It is advantageous that the positions of the set screws 135a and 135b be defined to be distant from the usable area of the movable mirror 136 as far as possible.

Regarding to the other movable mirror 137, as with the movable mirror 136 described above, the positions of the set screws 138a and 138b are defined to be out of the maximum usable area D2 of the movable mirror 137. By virtue of this, any harmful deformation of the reflecting surface 143 of the movable mirror 137, which may be possibly produced when the set screws 138a and 138b are tightened, may be effectively minimized.

In operation, the stage body or material piece support 133 is driven by means of the XY-stage 131 and the Z-stage 132 for desirable movements, while the position of the stage body 133 (and thus of the wafer W) is measured by using the interferometer 106 (see FIG. 10). More specifically, the laser beam B1 emitted to and incident on the movable mirror 136 is reflected by it and received by the interferometer 106, which measures the displacement of the stage body 133 (and thus of the wafer W) relative to the optical axis of the projection lens 102. In this measurement the position of the stage body 133 can be measured with precision because the movable mirror 136 is secured directly to the stage body 133 by the set screws 135a and 135b so that there can be almost no displacement of the movable mirror 136 relative to the stage body 133. When it is required to detach the movable mirror 136 from the stage body 133 for some reason or other, i.e., for repolishing the reflecting surface 141 of the movable mirror 136 or for repairing the movable mirror 136, such detachment may be easily achieved by loosening the set screws 135a and 135b. These merits are enjoyed by the other movable mirror 137 as well.

The material of the stage body 133 may consist mainly of any suitable, relatively inexpensive ceramic material having relatively high porosity. For example, the stage body 133 may be made of a ceramic material consists mainly of any of alumina ($Al_2O_3$) ceramics, silicon nitride ($Si_3N_4$) ceramics and sialon (Si-Al-O-N) ceramics. On the other hand, the material of the movable mirrors 136 and 137 which are required to have high reflectivity may consist mainly of any suitable, highly compact ceramic material having relatively low porosity. For example, the movable mirrors 136 and 137 may be made of a highly compact ceramic material which is created by processing the powder of the ceramic material for the stage body 133 through a known hot-isostatic-pressing process so as to improve compactness. This results in substantially the same thermal expansion coefficient between the stage body 133 and the movable mirrors 136 and 137, so that any possible deformation of the reflecting surfaces 141 and 134 of the movable mirrors 136 and 137, respectively, which may be caused by an environmental temperature change, may be effectively suppressed.

As described, in this embodiment, only the reflecting mirrors or movable mirrors 136 and 137 are made of a highly compact ceramic material (which is costly), so that the amount of the highly compact ceramic material can be saved for the stage body 133 so as to achieve a considerable reduction in the required amount of such a costly material, and thus the cost may be reduced over the case where all of the stage body 133 and the movable mirrors 136 and 137 are made of a highly compact ceramic material. Further, since the stage body 133 is made of a ceramic material, it may have a higher rigidity than a stage body made of any of glass materials. Moreover, since the movable mirrors 136 and 137 themselves are made of a highly compact ceramic material, they may enjoy a high reflectivity.

In addition, in the case where the ceramic material for the movable mirrors 136 and 137 is created by hot-isostaticpressing the powder of the ceramic material for the stage body 133, the ceramic material for the movable mirrors 136 and 137 and that for the stage body 133 will have the identical composition, so that the movable mirrors and the stage body may have substantially the same thermal expansion coefficient. By virtue of this, any possible deformation of the reflecting surfaces 141 and 143 of the movable mirrors 136 and 137 due to an environmental temperature change may be effectively suppressed.

Having described the present invention with reference to several preferred embodiments thereof, it is to be understood that the present invention is not limited to the preferred embodiments described, but may be embodied in various other forms and arrangements without departing the spirit and the scope of the present invention. For example, although each of the embodiments described shows an exemplified application of the present invention to a wafer stage in an exposure apparatus, the present invention is also applicable to a reticle stage in an exposure apparatus. Further, the present invention may be applicable to various other types of stages using an interferometric measurement system, such as a pattern position measuring system for measuring the coordinates of a pattern formed on a reticle.

The present patent application is based on Japanese Patent Applications No. 8-115332 filed on Apr. 12, 1996 and No. 8-221753 filed on Aug. 5, 1996. The entire disclosure of each of the Japanese patent application, including its specification, claims, drawings and summary, is incorporated herein by reference in its entirety.

What is claimed is:

1. A stage including a movable stage body for carrying a material piece thereon and a movable mirror secured onto said movable stage body and used for interferometric measurement of position of said stage body, wherein:

said movable mirror is made of a material consisting mainly of a first ceramic material; and said stage body is made of a material consisting mainly of a second ceramic material having a higher porosity than said first ceramic material.

2. A stage according to claim 1, wherein said first and second ceramic materials have substantially the same thermal expansion coefficient.

3. A stage according to claim 1, wherein said second ceramic material consists mainly of at least one of ceramic materials selected from the group consisting of alumina ($Al_2O_3$) ceramics, silicon nitride ($Si_3N_4$) ceramics and sialon (Si-Al-O-N) ceramics.

4. A stage according to claim 1, wherein said first ceramic material is created by processing powder of said second ceramic material through a hot-isostatic-pressing process.

5. A stage according to claim 1, further comprising connection means for mechanically connecting said movable mirror and said stage body to each other.

6. A stage according to claim 5, wherein positions at which said connection means connects said movable mirror and said stage body to each other are defined to be out of that area of a reflecting surface of said movable mirror within which a beam for interferometric measurement is incident on said mirror surface.

7. A stage according to claim 5, further comprising stress absorbing means for reducing propagation of deformation of said mirror induced by stress, said stress absorbing means being provided between i) positions at which said connection means connects said movable mirror and said stage body to each other and ii) a reflecting surface of said movable mirror.

8. A stage according to claim 7, wherein said stress absorbing means has a slit formed in said movable mirror.

* * * * *

UNITED STATES PATENT AND TRADEMARK OFFICE
CERTIFICATE OF CORRECTION

PATENT NO. : 6,264,165 B1
DATED : July 24, 2001
INVENTOR(S) : Yutaka Hayashi

It is certified that error appears in the above-identified patent and that said Letters Patent is hereby corrected as shown below:

<u>Title page,</u>
Item [75] Inventors, please delete Mr. Toshiya Ohtomo as a named inventor.
Mr. Yutaka Hayashi is the sole inventor of this patent.

Signed and Sealed this

Twenty-sixth Day of February, 2002

Attest:

Attesting Officer

JAMES E. ROGAN
Director of the United States Patent and Trademark Office